UNITED STATES PATENT OFFICE.

VIGGO DREWSEN, OF BROOKLYN, NEW YORK.

PRODUCTION OF ACETONE BY DISTILLATION OF SODIUM ACETATE, &c.

1,385,866.  Specification of Letters Patent.  Patented July 26, 1921.

No Drawing.  Application filed September 8, 1916. Serial No. 118,981.

*To all whom it may concern:*

Be it known that I, VIGGO DREWSEN, a citizen of the United States, and resident of the borough of Brooklyn, county of Kings, city and State of New York, have made a certain new and useful Invention Relating to Production of Acetone by Distillation of Sodium Acetate, &c., of which the following is a specification.

This invention relates especially to the distillation of sodium or potassium acetate by first dehydrating the same by combination with caustic lime and then dry distilling the dehydrated material at a temperature of about 300° to 400° C. preferably with the use of superheated steam, etc. which gives substantially the theoretical yield of acetone with practically no decomposition thereof into methane, etc.

In carrying out this process sodium acetate crystals may be largely or substantially dehydrated by first melting them and heating to about 100° C. or so and then incorporating caustic high calcium lime or preferably magnesian lime in powdered form to the extent of about one-third of the weight of the acetate crystals. When this lime is quickly added and stirred into the mass of molten acetate a violent reaction occurs, the mixture boiling and bubbling up with the evolution of steam until finally the dehydrated acetate is produced in the form of a dry whitish powder.

This acetate lime mixture is then dry distilled, preferably in a rotary metal retort at about 300° or 400° C. preferably with the use of superheated steam or ordinary steam which is passed through the retort and which seems to facilitate the reaction and consequent liberation of acetone in a substantially pure state which may be received and condensed in suitable separating apparatus. If desired, a vacuum receiver may be employed which somewhat promotes the evolution of acetone at a moderate temperature in proportion to the degree of vacuum on the retort. The results obtained by this process closely approximate the full theoretical yield as much as about 95% or so of the theoretical quantity of acetone in the acetate being recoverable in this way and yields between 90% and 95% being repeatedly secured. The acetone thus produced is also of an unusually high grade of purity and does not discolor when exposed to the light.

This invention has been described in connection with a number of illustrative ingredients, arrangements, proportions, conditions, apparatus, character and order of steps, to the details of which disclosure the invention is not of course limited.

What is claimed as new and what is desired to be secured by Letters Patent is set forth in the appended claims:

1. The process of distilling sodium acetate to produce acetone comprising melting crystallized sodium acetate and heating the same to about 100° C., incorporating therewith about one-third of its weight of powdered caustic magnesian lime to dehydrate the acetate to whitish powder and dry distilling the same at about 300° to 400° C. in the presence of superheated steam to secure a yield of acetone at least equaling substantially 95% of the theoretical yield.

2. The process of distilling sodium acetate to produce acetone comprising melting sodium acetate and incorporating therewith about one-third of its weight of powdered caustic magnesian lime to dehydrate the acetate to powder and dry distilling the same at about 300° to 400° C. in the presence of superheated steam to secure a high yield of acetone.

3. The process of distilling acetate of an alkali metal to produce acetone comprising melting the crystallized acetate and incorporating therewith about one-third of its weight of powdered caustic magnesian lime and dry distilling the same at about 300° to 400° C. in the presence of superheated steam to secure a high yield of acetone at least equaling substantially 90% of the theoretical yield.

4. The process of distilling acetate of an alkaline metal to produce acetone comprising melting the crystallized acetate and incorporating and combining therewith about one-third of its weight of powdered caustic lime and dry distilling the same in the presence of steam to secure a high yield of acetone.

5. The process of producing acetone which comprises incorporating and combining caustic lime with melted sodium acetate to dehydrate the acetate and dry distilling the same in the presence of steam.

6. The process of producing acetone which comprises incorporating sufficient caustic lime with sodium acetate to dehydrate the acetate and dry distilling the same.

7. The process of distilling sodium acetate to produce acetone comprising melting sodium acetate crystals and incorporating therewith at least 20% of its weight of caustic magnesium lime to dehydrate the acetate and produce finely divided acetate material and dry distilling the same in the presence of superheated steam to secure a high yield of acetone.

8. The process of distilling sodium acetate to produce acetone comprising melting sodium acetate and incorporating and combining therewith caustic lime and dry distilling the same to secure a high yield of acetone.

VIGGO DREWSEN.

Witnesses:
HARRY L. DUNCAN,
HARRY D. HENSCHEL.